UNITED STATES PATENT OFFICE.

ALBRECHT HEIL, OF FRANKFORT-ON-THE-MAIN, GERMANY, ASSIGNOR TO CONRAD HUBERT AND SAMUEL STERN, BOTH OF NEW YORK, N. Y.

GALVANIC CELL.

1,057,830.      Specification of Letters Patent.      Patented Apr. 1, 1913.

No Drawing. Original application filed January 3, 1911, Serial No. 600,567. Divided and this application filed January 17, 1913. Serial No. 742,651.

*To all whom it may concern:*

Be it known that I, ALBRECHT HEIL, a subject of the Emperor of Germany, residing at Frankfort-on-the-Main, Germany, have invented certain new and useful Improvements in Galvanic Cells, of which the following is a specification.

My invention relates to galvanic cells and more particularly to galvanic cells of the kind described in my application Serial No. 600,567, filed January 3, 1911, of which this application is a division, and my application Serial No. 634,146, filed June 19, 1911, which is also a division of said original application Serial No. 600,567. In my said original application, Serial No. 600,567, is described and claimed a depolarizing mass formed of an intimate mixture of graphite and dark brown good-conducting manganic hydrate, which is the hydrate of the sesquioxid of manganese, corresponding to the formula $Mn(OH)_3$. This dark brown manganic hydrate may be readily made from manganous hydrate, which is of light yellow color and is a very poor conductor of electricity. If this light yellow manganous hydrate is given a long exposure to the atmosphere, it is oxidized and becomes dark brown manganic hydrate, or if it is brought while in a moist condition into an atmosphere rich in oxygen a like oxidation takes place. In my said divisional application Serial No. 634,146 is described and claimed a depolarizing material of another hydrate of manganese, which is the deep black, good-conducting hydrate of manganese dioxid, such as is obtained by adding hypochlorite of soda to manganese lyes.

I have discovered that an excellent depolarizer is obtained by intimately mixing dark brown good-conducting manganic hydrate and deep black good-conducting hydrate of manganese dioxid and finely powdered carbon (graphite). This depolarizing mass may be used in the usual manner about the carbon electrode, and this depolarizing electrode may be used opposite a zinc electrode in a solution of nitrate of ammonium or chlorid of ammonium or the like. Such cells have been found to produce extremely satisfactory results.

I claim:

1. A galvanic cell comprising positive and negative elements, and a depolarizing mass containing dark brown good-conducting manganic hydrate and deep black good-conducting hydrate of manganese dioxid.

2. A galvanic cell comprising positive and negative elements, and a depolarizing mass composed of an intimate mixture of dark brown good-conducting manganic hydrate and deep black good-conducting hydrate of manganese dioxid and carbon.

3. A galvanic cell comprising a positive zinc element, a negative carbon element and a depolarizing mass for the negative carbon element containing dark brown good-conducting manganic hydrate and deep black good-conducting hydrate of manganese dioxid and carbon.

4. A galvanic cell comprising a positive zinc element, a negative carbon element, and a depolarizing mass for the negative carbon element composed of an intimate mixture of dark brown good-conducting manganic hydrate and deep black good-conducting hydrate of manganese dioxid and carbon.

In testimony whereof I have affixed my signature in presence of two witnesses.

ALBRECHT HEIL.

Witnesses:
JEAN GRUND,
CARL GRUND.

Copies of this patent may be obtained for five cents each, by addressing the "Commissioner of Patents, Washington, D. C."